United States Patent [19]
Gotoh et al.

[11] Patent Number: 5,326,945
[45] Date of Patent: Jul. 5, 1994

[54] SHOCK SENSOR

[75] Inventors: Noriyuki Gotoh; Yasunori Ohtuki; Naoharu Yamamoto, all of Miyagi; Hiroyuki Sada, Hyogo; Akihiko Kuroiwa, Hyogo; Hiroshi Moriyama, Hyogo, all of Japan

[73] Assignees: Tokin Corporation, Sendai; Sensor Technology Co. Ltd., Kobe, both of Japan

[21] Appl. No.: 984,908

[22] Filed: Dec. 2, 1992

[30] Foreign Application Priority Data

| Dec. 2, 1991 | [JP] | Japan | 3-108237[U] |
| Jan. 20, 1992 | [JP] | Japan | 4-1553[U] |
| Jan. 20, 1992 | [JP] | Japan | 4-1554[U] |
| Jan. 29, 1992 | [JP] | Japan | 4-8948[U] |
| Apr. 8, 1992 | [JP] | Japan | 4-116986 |
| Jun. 30, 1992 | [JP] | Japan | 4-45562[U] |

[51] Int. Cl.[5] .................. H01H 35/14; H01H 9/00
[52] U.S. Cl. ................ 200/61.45 R; 200/61.45 M; 200/61.53; 335/205
[58] Field of Search ...... 200/61.45 M, 82 E, 61.45 R, 200/61.53, ; 335/154, 205-207; H01H 9/00, 35/02, 35/14

[56] References Cited

U.S. PATENT DOCUMENTS

| 3,671,892 | 6/1972 | Eaton | 335/154 |
| 3,795,780 | 3/1974 | Lawrie | 200/61.45 R |
| 4,705,922 | 11/1987 | Seeger et al. | 200/61.45 M |
| 4,792,651 | 12/1988 | Whiting | 200/82 E |
| 4,877,927 | 10/1989 | Reneau | 200/61.45 M |
| 5,212,357 | 5/1993 | Reneau | 200/61.45 M |

Primary Examiner—J. R. Scott
Attorney, Agent, or Firm—Hopgood, Calimafde, Kalil, Blaustein & Judlowe

[57] ABSTRACT

To detect an impact due to a shock with high precision and stability, a shock sensor is employed which provides a sufficiently long closure interval of a contact of a reed switch (1) enough to carry out signal processing. A gap between an outer surface of a magnet (2) and an inner wall (8) of a housing (7) defining a passage for the magnet (2) comprises a first gap (G1) between a stationary position and an activating position and a second gap (G2) between the activating position and a stop position. The inner wall (8) is formed so that the first gap (G1) is greater than the second gap (G2). The velocity of the magnet (2) is lower when travelling in the second gap (G2) than the velocity in the first gap (G1) because air resistance is greater in the second gap (G2). Accordingly, the closure interval is increased. Alternatively, the closure interval of the contact of the reed switch (1) is adjusted by first and second coil springs (3, 49) which independently urge first and second magnets (2, 48) in an anti-impact direction, respectively. To cope with various collision modes, spring constants (k1, k2) of the first and the second coil springs (3, 49) and masses (m1, m2) of the first and the second magnets (2, 48) are selected so that the velocity of shock-responsive movement is different between a first group comprising the first magnet (2) and the first coil spring (3) and a second group comprising the second magnet (48) and the second coil spring (49).

7 Claims, 6 Drawing Sheets

SHOCK SENSOR

BACKGROUND OF THE INVENTION

This invention relates to a shock sensor which is used, for example, as a collision sensor in an occupant protection device such as an air bag system mounted in a mobile body including an automobile to protect an occupant upon occurrence of a crash or collision of the mobile body. In particular, this invention relates to a shock sensor having a reed switch for detecting impact or acceleration produced upon reception of a shock such as a collision.

A conventional shock sensor of the type described comprises a reed switch, a magnet, and a housing. The magnet is responsive to the impact and moves in a passage defined by an internal surface of the housing along a travelling stroke from a stationary position to a stop position. The magnet is operable to apply a magnetic field to a contact of the reed switch to close the contact when the magnet reaches an area in the vicinity of the reed switch. The area will be referred to as an activating area. The contact is kept closed while the magnet is present in the activating area. Thus, the impact is detected. In the conventional shock sensor, a gap between an outer surface of the magnet and the internal surface of the housing is uniform throughout the travelling stroke. In response to the impact, the magnet uniformly rapidly moves along the travelling stroke because the gap is uniform. In this event, the contact of the reed switch can only be closed for a very short time. It is therefore difficult to obtain an accurate and stabilized electric signal as a detection signal. If such a shock sensor is used as a collision sensor in an occupant protection device such as an air bag system, it is often impossible to supply a processing circuit with a necessary and sufficient signal enough to actuate the occupant protection device upon occurrence of a shock such as a collision.

In the conventional shock sensor, the magnet is brought into contact with a wall surface (stopper) without controlling the movement of the magnet driven by acceleration. This results in increase of a bounding amplitude of the magnet due to bounce at the wall surface and a returning force derived from an elastic force of a spring. Consequently, the contact of the reed switch suffers chattering which often causes an operation error to occur.

In some of the conventional shock sensors, a cylindrical body (holder) is receive din a through hole extending through the magnet and the coil spring. The reed switch is located in the cylindrical body. In this case, the reed switch extends in a direction coincident with a direction of the travelling stroke of the magnet. Accordingly, the shock sensor of this type must be greater in size along an acceleration detecting direction than the reed switch. This results in restriction of the size of the shock sensor.

On the other hand, in the shock sensor, the magnet must be present within a predetermined area or the activating area for a long time so as to increase a closure interval of the contact of the reed switch. In order to provide the closure interval as required, various proposals have been made. For example, a spring constant of the coil spring is selected to be an appropriate value or a frictional coefficient between the magnet and the cylindrical body is increased. However, such proposals alone can not cover various collision modes, for example, a head-on collision and an oblique collision. Thus, it is difficult for the conventional shock sensors to obtain a sufficiently long closure interval.

In some of the conventional shock sensors, use is made of a nonmagnetic block for maintaining the magnet within the activating area. The magnet is retained in the predetermined are of the activating area for a long time by making an inertial force of the nonmagnetic block depend upon variation of the acceleration caused by the collision. With this structure, it is also difficult to provide a sufficiently long closure interval for any one of the various collision modes. In addition, the shock sensor of this type has a structure such that the nonmagnetic block is mounted on a carriage. Accordingly, the movement of the nonmagnetic block completely follows the movement of the carriage. Sometimes, the inertial force of the nonmagnetic block can not be fully utilized due to the movement of the carriage.

SUMMARY OF THE INVENTION

In order to remove the above mentioned disadvantages, it is a first object of this invention to provide a shock sensor which assures a sufficiently long closure interval of a contact of a reed switch to enable signal processing.

It is a second object of this invention to provide a shock sensor capable of avoiding an operation error by suppressing occurrence of chattering of a contact of a reed switch due to bounce of a magnet which collides with a stopper wall surface.

It is a third object of this invention to provide a shock sensor which has a small size along an acceleration detecting direction and which can detect acceleration with high precision and stability.

It is a fourth object of this invention to provide a shock sensor which can provide a sufficiently long closure interval of a contact of a reed switch.

It is a fifth object of this invention to provide a shock sensor which can provide an adjustable closure interval of a contact of a reed switch.

Briefly stated, this invention provides a shock sensor which can provide a sufficiently long closure interval of a contact of a reed switch, which can detect impact with high precision and stability, and which has a small size.

According to this invention, there is provided a shock sensor which comprises a reed switch, a magnet, an elastic member, and a housing for containing the reed switch, the magnet, and the elastic member, the magnet being responsive to impact and moving from a stationary position to a stop position against an elastic force of the elastic member to activate the reed switch, wherein a gap between an outer surface of the magnet and an internal surface of the housing defining a passage for the magnet is varied along a travelling stroke from the stationary position to the stop position.

Preferably, the housing has an air passage for circulating air through the passage for the magnet while the magnet is moved.

According to this invention, there is also provided a shock sensor comprising a magnetic field generating unit and a reed switch both of which are responsive to impact and perform relative movement with respect to each other in a predetermined direction, the magnetic field generating unit being for producing a magnetic field, the reed switch being operable in response to the magnetic field, wherein the reed switch has a cylindrical axis and a contact, the cylindrical axis extending in a direction perpendicular to the predetermined direction.

Preferably, the shock sensor comprises a frame for fixing the reed switch, the magnetic field producing unit having a permanent magnet movable in the predetermined direction with respect to the frame, the contact being located at the side of a travelling path of the permanent magnet.

Preferably, the permanent magnet has a magnetized surface opposite to the reed switch.

Preferably, the permanent magnet has a magnetic member formed on at least one surface adjacent to the magnetized surface.

Preferably, one edge of the magnetic member that faces the reed switch is projected from the magnetized surface of the permanent magnet towards the reed switch.

According to this invention, there is provided a shock sensor comprising a reed switch, a magnet which is responsive to impact due to a shock and moves to activate the reed switch, and a coil spring (i.e., an elastic member) for urging the magnet, wherein a ferromagnetic member is located at a position which is in close proximity of the outer periphery of the magnet while the magnet is present in an activating area where the magnet activates the reed switch.

According to this invention, there is provided a shock sensor comprising a reed switch, a first cylindrical member for containing the reed switch, a first magnet which is loosely fitted to an outer surface of the first cylindrical member and which is responsive to impact due to a shock and moves to activate the reed switch, a first coil spring for urging the first magnet in an anti-impact direction, a second cylindrical member concentric with the first cylindrical member and for containing the first magnet, a second magnet or magnetic block which is loosely fitted to an outer surface of the second cylindrical member and which is responsive to the impact and moves to activate the reed switch, and a second coil spring for urging the second magnet or magnetic block in the anti-impact direction, wherein first and second spring constants k1 and k2 of the first and the second coil springs and first and second masses m1 and m2 of the first magnet and the second magnet or magnetic block are selected so that $k1 < k2$ and $m1 \geq m2$ or $k1 > k2$ and $m1 \leq m2$ to thereby make a difference in velocity of impact-responsive movement between a first group including the first magnet and the first coil spring and a second group including the second magnet or magnetic block and the second coil spring.

Preferably, the shock sensor further comprises control means connected to at least one of said magnetic field generating unit and said reed switch for controlling said relative movement in said predetermined direction.

DESCRIPTION OF THE PREFERRED EMBODIMENTS

Figure 1:
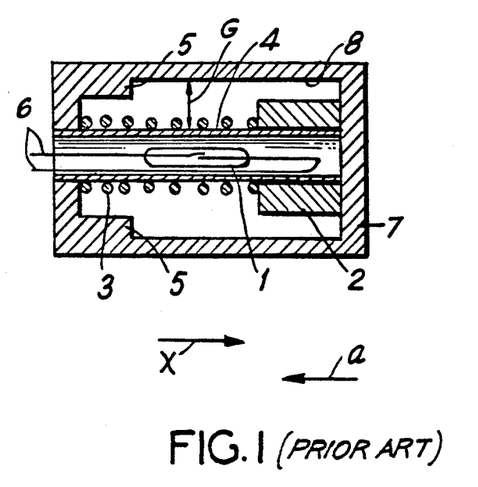
FIG. 1 is a vertical sectional view of a conventional shock sensor.

Prior to description of the preferred embodiments of this invention, a conventional shock sensor will at first be described with reference to FIG. 1 for a better understanding of this invention. Referring to FIG. 1, the illustrated conventional shock sensor is in a normal state without impact or acceleration. The conventional shock sensor is mounted as a collision sensor in a mobile body (not shown) such as an automobile with its left side in the figure located forward in an advancing direction of the mobile body.

The shock sensor comprises a reed switch 1, a cylindrical perforated or annular magnet 2, an elastically yieldable element comprising a coil spring 3, a cylindrical member 4, a hollow housing 7 containing the reed switch 1, a cylindrical perforated or annular magnet 2, and a coil spring which surrounds cylindrical member 4. As illustrated in FIG. 1, an opening having a diameter equal to an outer diameter of the cylindrical member 4 is formed in a left side surface of the housing 7. A leftmost end of the cylindrical member 4 is fixed to the opening. The reed switch 1 is fixed at an approximate center of the cylindrical member 4 so that a center axis of the reed switch 1 is coincident with a center axis of the cylindrical member 4. The coil spring 3 and the magnet 2 are arranged on an outer peripheral surface of the cylindrical member 4. Output terminals 6 of the reed switch 1 are drawn out from the leftmost end of the cylindrical member 4 along an axial direction of the reed switch 1. The output terminals 6 are connected to a processing circuit (not shown).

In the shock sensor, the coil spring 3 is arranged in the hollow housing 7 around a lefthand portion of the cylindrical member 4 and covers the reed switch 1 while a leftmost end of the coil spring 3 is kept in contact with a left side of an inner wall 8 of the housing 7. The magnet 2 is arranged in the hollow housing 7 around a righthand portion of the cylindrical member 4 while a rightmost end of the magnet 2 is kept in contact with a right side of the inner wall 8 of the housing 7. In addition, a rightmost end of the coil spring 3 and a leftmost end of the magnet 2 are kept in contact with each other. Thus, in the housing 7, the magnet 2 is loosely or movably arranged on the right side of the outer peripheral surface of the cylindrical member 4 in order to be slidable along an axial direction of the cylindrical member 4. The coil spring 3 is arranged on the left side of the outer peripheral surface of the cylindrical member 4 to be contractible and expandable along the axial direction of the cylindrical member 4.

In this state, the magnet 2 is urged by the coil spring 3 in a rightward direction to be kept stationary at a position which will be referred to as a stationary position. At the stationary position, a contact of the reed switch 1 is closed because the magnet 2 is distant or remote from the contact of the reed switch 1 as illustrated in FIG. 1.

Leftwardly ahead of the reed switch 1, a stopper 5 is formed on an inner wall 8 of the housing 7 to project therefrom. The stopper 5 is for restricting the movement of the magnet 2 along the axial direction. Thus, the magnet 2 is allowed to move until the leftmost end of the magnet 2 is brought into contact with the stopper 5. The position where the magnet 2 is brought into contact with the stopper 5 will be referred to as a stop position.

As described, the magnet 2 is movable between the stationary position and the stop position. While the magnet 2 is moving between the stationary position and the stop position leftwardly in FIG. 1, there is a position where the contact of the reed switch 1 starts its closure in response to a magnetic field of the magnet 2. The position where the contact of the reed switch 1 starts it closure is referred to as an activating position.

It is assumed here that the shock sensor of the above-mentioned structure is subjected to acceleration or impact greater than a predetermined value in a direction depicted by an arrow X in the figure (the direction will hereinafter be referred to as an acceleration acting direction X). In this event, the magnet 2 moves against an elastic force (urging force) of the coil spring 3 from the stationary position to the stop position along a direction Ad (hereinafter referred to an acceleration or impact detecting direction Ad) opposite to the acceleration acting direction X. Thus, the reed switch 1 is activated (closed). When the acceleration is released thereafter, the magnet 2 is returned back from the stop position to the stationary position by the elastic force of the coil spring 3.

Now, description will proceed to an acceleration detecting operation of the shock sensor. When no acceleration is applied to the shock sensor, the magnet 2 is kept at the stationary position as shown in FIG. 1 while the contact of the reed switch 1 is opened.

It is assumed here that the acceleration greater than a predetermined value is applied to the shock sensor in the acceleration acting direction X. In this event, the magnet 2 starts to move from the stationary position towards the stop position. When the magnet 2 reaches the activating position, the contact of the reed switch 1 is closed. The contact of the reed switch 1 is kept closed while the magnet 2 is travelling from the activating position to the stop position.

When the acceleration is then released, the magnet 2 is returned back from the stop position to the stationary position by the elastic force (urging force) of the coil spring 3. In this returning step also, the contact of the reed switch 1 is kept closed while the magnet 2 is travelling from the stop position back to the activating position. In this connection, an area between the activating position and the stop position will be referred to as an activating area. When the contact of the reed switch 1 is close in response to the magnetic field from the magnet 2, an electric signal is produced as an acceleration detection signal representative of detection of the acceleration greater than the predetermined value.

However, in the shock sensor illustrated in FIG. 1, a gap G between an outer surface of the magnet 2 and the internal wall 8 of the housing 6 defining a passage for the magnet 2 has a uniform size throughout a travelling stroke between the stationary position and the stop position. In this connection, when subjected to momentary acceleration, the magnet 2 uniformly rapidly moves through the gap G without reducing its velocity in the activating area. The closure interval of the contact of the reed switch 1 is therefore very short. Accordingly, it is impossible to obtain an accurate and stabilized electric signal. In addition, the magnet 2 is brought into contact with the stopper 5 without controlling the movement of the magnet 2 caused by the acceleration. This brings about an increase of a bounding amplitude of the magnet 2 due to bounce at the stopper 5 and a returning force derived from the elastic force of the coil spring 3.

The above-described shock sensor is disadvantageous in that the closure interval of the contact of the reed switch 1 is too short to produce necessary and sufficient signal enough to trigger an occupant protection device upon occurrence of a shock such as a collision. In addition, the contact of the reed switch 1 suffers chattering to cause an operation error to occur.

Figure 2:
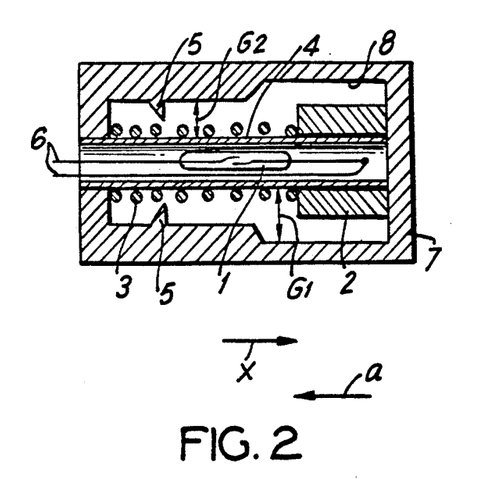
FIG. 2 is a vertical sectional view of a shock sensor according to a first embodiment of this invention.

Now, description will be made as regards this invention. FIG. 2 shows a shock sensor according to a first embodiment of this invention. In the illustrated shock sensor, a gap between an outer surface of a magnet 2 and an inner wall 8 of a housing 7 defining a passage for the magnet 2 comprises a first gap G1 and a second gap G2 generally before and after the activating position. The first and the second gaps G1 and G2 are different in size from each other (will be described later in detail). Other structure is substantially similar to that of the conventional shock sensor illustrated in FIG. 1. Accordingly, similar parts are designated by like reference numerals and will not be described any longer.

It will be understood that such a gap swerves to decrease a velocity of the magnet 2 in the activating area during reciprocatory movement of the magnet 2 so as to increase the closure interval of a contact of the reed switch 1.

In the first embodiment of this invention, the gap between the outer surface of the magnet 2 and the inner wall 8 of the housing 7 defining the passage for the magnet 2 comprises the first gap G1 along a part of the travelling stroke between the stationary position and the activating position and the second gap G2 along a remaining part of the travelling stroke between the activating position and the stop position. The inner wall 8 is formed so that the first gap G1 is greater than the second gap G2.

During the travelling stroke with the second gap G2, the magnet 2 is subjected to air resistance greater, or air-damped more, than that during the travelling stroke with the first gap G1. As a result, the shock sensor (FIG. 2) according to this invention can decrease a velocity of the magnet 2, as compared with the conventional shock sensor (FIG. 1) having the uniform gap G. Thus, the reed switch 1 of the shock sensor according to this invention is kept closed for a time interval longer than that of the conventional shock sensor.

Since the first gap G1 has a relatively large size, the magnet 2 is subjected to smaller air resistance during the stroke from the stationary position to the activating position. During this stroke, the moving velocity of the magnet 2 is great so that a response is quick. In the second gap G2, air resistance is increased to reduce the velocity of the magnet 2. Thus, control is carried out to suppress the movement of the magnet 2 caused by the acceleration as well as the movement of the magnet 2 caused by bounce at the stopper 5 and the returning force derived from the elastic force of the coil spring 3.

As a result, the bounding amplitude of the magnet 2 is reduced. It is therefore possible to avoid chattering, namely, quick repetition of closure and opening of the contact in a short time, which is often caused in the conventional shock sensor.

Figure 3:
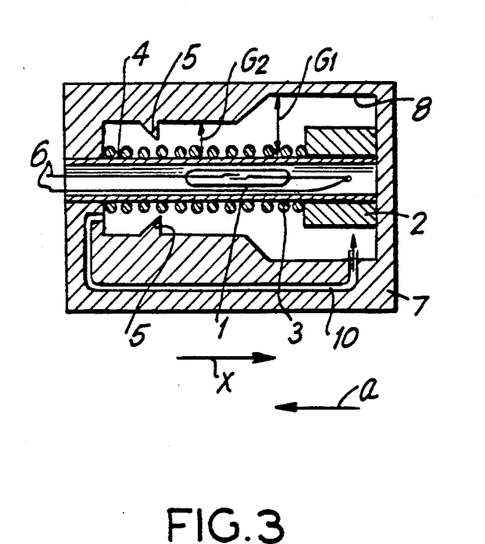
FIG. 3 is a vertical sectional view of a shock sensor according to a second embodiment of this invention.

Referring to FIG. 3, the shock sensor according to a second embodiment of this invention has a structure similar to that illustrated in FIG. 2 except that an air passage 10 is formed. Accordingly, similar parts are designated by like reference numeral sand will not be described any longer.

The air passage 10 is for circulating air through the passage for the magnet 2 while the magnet 2 is moved in response to the acceleration applied to the shock sensor along the acceleration acting direction X. In this embodiment, the air passage 10 is formed in the inner wall 8 of the housing 7 to connect a left side portion and a right bottom portion of the passage of the magnet 2.

It is to be noted that the air passage 10 is not restricted to the configuration illustrated in FIG. 3 and may be formed into any appropriate shape. In addition, any plural number of air passages 10 may be formed. By selecting the configuration and the number of the air passages 10, it is possible to control the velocity of the magnet 2 when the acceleration is applied to the shock sensor. Therefore, the closure interval of the contact of the reed switch 1 can be adjusted as required.

Figure 4:
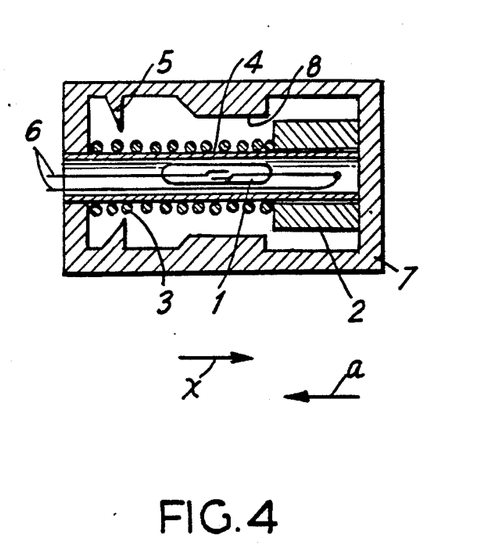
FIG. 4 is a vertical sectional view of a shock sensor according to a third embodiment of this invention.

In the shock sensor according to this invention, it is possible to perform fine adjustment of the velocity of the magnet 2 if the gap in the inner wall 8 of the housing 7 has different shapes divided by a plurality of positions as shown in FIG. 4.

It is noted that the shock sensor according to this invention is not restricted to the structures illustrated in FIGS. 2 through 4. In FIGS. 2 through 4, the travelling direction of the magnet 2 and the axial direction of the reed switch 1 are coincident with each other. However, the travelling direction of the magnet 2, which is moved when the acceleration is applied to the shock sensor, may be perpendicular to the axial direction of the reed switch 1. In the foregoing embodiments, a compression spring (urging means) is used as a coil spring. Instead, use may be made of an extension spring or any other appropriate elastic member.

According to this invention, the shock sensor at least comprising a reed switch, a magnet, and an elastic member (urging means) has a structure such that the gap between the outer surface of the magnet and the inner wall of the housing defining the passage for the magnet has different sizes along the travelling stroke of the magnet. With this structure, air resistance against the magnet is increased in a narrower part of the gap. It is therefore possible to increase the closure interval of the contact of the reed switch and to avoid chattering.

However, in the shock sensor described above, the cylindrical body 4 is arranged in a through hole extending through the magnet 2 and the coil spring 3. The reed switch 1 is located in the cylindrical body 4. Since the extending direction of the reed switch 1 is coincident with the travelling direction of the magnet 2, the shock sensor must be greater in size along the acceleration detecting direction Ad than the reed switch 1. Accordingly, the size of the shock sensor can not be reduced with this structure.

Figure 5:
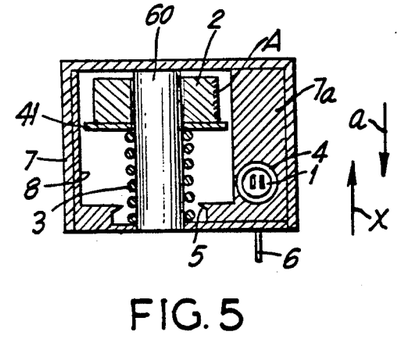
FIG. 5 is a vertical sectional view of a shock sensor according to a fourth embodiment of this invention.
Figure 6:
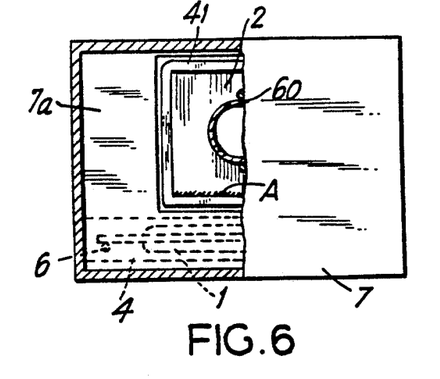
FIG. 6 is a plan view of the shock sensor illustrated in FIG. 5.

FIG. 5 shows a shock sensor according to a fourth embodiment of this invention and FIG. 6 shows a plan view of the shock sensor. Referring to FIGS. 5 and 6, the shock sensor comprises the cylindrical permanent magnet 2 of a surface magnetization type as magnetic field producing means. The permanent magnet 2 has a through hole and is located adjacent one end of the inner wall 8 of the housing 7. The coil spring 3 extends from the other end of the inner wall 8 opposite to the one end of the inner wall 8. The magnet 2 is urged by the coil spring 3 as urging means towards the one end of the inner wall 8. Thus, the balance is maintained in a normal state to define the stationary position of the magnet 2.

The coil spring 3 elastically holds the magnet 2 and restricts the traveling stroke of the magnet 2 following the elastic displacement of the coil spring 3 upon reception of the acceleration. When the acceleration is applied by an external impact caused by a shock such as a collision, the coil spring 3 is elastically displaced to move the magnet 2 from the stationary position to the activating position contributing to activation of the reed switch 1 and then to the stop position.

The magnet 2 has a magnetized surface A opposite to the reed switch 1 and supplies the magnetic field to the reed switch 1 to activate the reed switch 1. A magnetic member 41 is interposed between the magnet 2 and the coil spring 3. An edge of the magnetic member 41 is projected from the magnetized surface A towards the reed switch 1. With this structure, magnetic flux produced from the magnet 2 is prevented from unnecessary leakage and the magnet 2 is efficiently guided within the traveling stroke. The magnetic member 41 is formed on one surface of the magnet 2 that is adjacent to the magnetized surface A.

On the other hand, a shaft 60 is inserted in the through hole extending through the magnet 2 and the coil spring 3. The stopper 5 is formed on the inner wall 8 of the housing 7 to inhibit excess movement of the magnet 2 along the acceleration detecting direction Ad. As shown in the figure, a wide side frame 7a is formed in the housing 7 at one side thereof in a direction perpendicular to the acceleration detecting direction Ad. In the side frame 7a, the reed switch 1 is embedded at a position adjacent to the travelling stroke of the magnet 2 and extends in a direction intersecting with the travelling direction of the magnet 2 in a spatial arrangement. In the illustrated example, the reed switch 1 extends in a direction perpendicular to the travelling direction of the magnet 2.

The reed switch 1 comprises an elongated cylinder and a contact arranged din the cylinder. The reed switch 1 is fixed in the cylindrical member 4 and is operable in response to the magnetic field from the magnetized surface A of the magnet 2. Specifically, the reed switch 1 has a cylindrical axis extending in a direction perpendicular to the travelling direction of the magnet 2. The contact of an electroconductive switch in the cylinder is located apart from the stationary position and at a side of the travelling stroke (passage) of the magnet 2 following the elastic displacement of the coil spring 3 upon reception of the acceleration. With this arrangement, the contact is inhibited from being closed due to influence of the magnetic field from the magnet 2 which is maintained at the stationary position in a normal state. The reed switch 1 is connected to an output terminal 6 outwardly projecting from the housing 7 along the travelling direction of the magnet 2. Thus, the reed switch 1 can be electrically connected to an external apparatus through the output terminal 6.

In the shock sensor of the above-mentioned structure, the acceleration detecting direction Ad and the travelling direction of the magnet 2 are coincident with each other while the reed switch 1 extends in the direction perpendicular to those directions (the downward direction in the figure). With this structure, the size in the acceleration detecting direction Ad can be reduced. Since the travelling direction of the magnet 2 is coincident with the acceleration detecting direction Ad, the acceleration detecting operation can be performed in a manner similar t the conventional shock sensor.

In this embodiment, the magnetic member 41 is interposed between the magnet 2 and the coil spring 3 to shut off the magnetic flux leakage from the magnet 2 towards the coil spring 3. The reed switch 1 is at first located forwardly of the magnetic member 41 together with the coil spring 3. In this event, the magnetic flux is shut off by the magnetic member 41 and can not reach the reed switch 1. With the movement of the magnet 2, the reed switch 1 is aligned with the magnetic member 41 and then located backwardly of the magnetic member 41 together with the magnet 2. In this event, magnetic flux is applied to the reed switch 1. Thus, the magnetic member 41 absorbs and shuts off the magnetic flux leakage from the magnetized surface A to suppress hysteresis of an overlapping portion of a contact closure area and a contact open area within the travelling stroke.

Figure 7A:
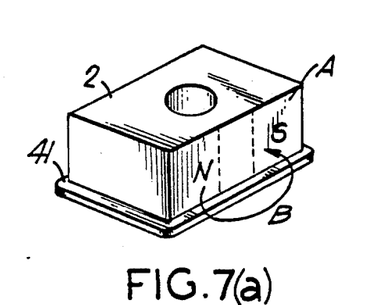
FIG. 7(a) is a perspective view of a main portion of the shock sensor illustrated in FIG. 5.
Figure 7B:
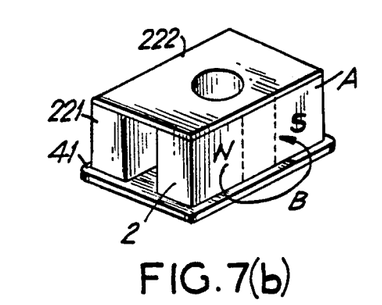
FIG. 7(b) is a perspective view of a modification of the main portion of the shock sensor.

FIG. 7(a) is a perspective view of the magnet 2 and the magnetic member 41. FIG. 7(b) is a perspective view of a modification of the magnet 2 and the magnetic member 41. In each figure, the magnet 2 has a magnetized surface A and a through hole and the direction B of the magnetic flux (density) from a magnetic pole N to a magnetic pole S in the magnetized surface A is common.

The magnet 2 illustrated in FIG. 7(a) has a rectangular parallelopiped shape. In the modification illustrated in FIG. 7(b), the magnet 2 and a nonmagnetic balancing member 221 are mounted on the magnetic member 41 opposite to each other with a space left therebetween. A nonmagnetic fixing member 222 having a through hole is superposed on the magnet 2 and the nonmagnetic balancing member 221. In either case, the magnetized surface A of the magnet 2 is opposite to the reed switch 1 and the edge of the magnetic member 41 is projected from the magnetized surface A of the magnet 2 towards the reed switch 1. Accordingly, the hysteresis becomes small. Thus, reliable operation of the contact of the reed switch 1 is assured and the acceleration is detected with a high precision. It is noted that the magnet 2 is not restricted to the above-mentioned configurations. The magnet 2 may have any other shape so far as the magnetized surface A is opposite to the reed switch 1.

In the meanwhile, the shock sensor is widely used as a collision sensor in an air bag system particularly as a subsidiary or safety shock sensor for a main shock sensor. The subsidiary shock sensor is for preventing an operation error of the air bag system to improve reliability of the air bag system.

Figure 8:
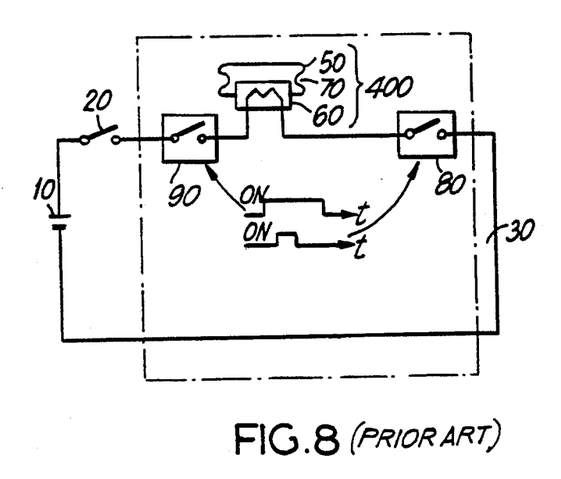
FIG. 8 shows a circuit diagram of a conventional air bag system including a shock sensor.

FIG. 8 is a circuit diagram of a conventional air bag system. The air bag system circuit comprises an on-vehicle power supply 10, an ignition switch 20, an activator 30. The activator 30 comprises a main shock sensor 80, a subsidiary shock sensor 90, and an air bag module 400.

The air bag module 400 comprises an air bag 50, a gas generator 60 for expanding the air bag 50, and a squib 70 for starting the gas generator 60. The air bag module 400 is mounted in a steering column or a console box before a front passenger's seat.

The activator 30 comprises a serial circuit including a main shock sensor 80 and a subsidiary shock sensor 90. For example, the main shock sensor 80 comprises an electrical contact mechanically closed upon occurrence of a shock such as a collision. Alternatively, the main shock sensor 80 comprises a piezoelectric element or a semiconductor element for producing an electric signal proportional to a magnitude of the acceleration. In accordance with shock sensing characteristics, the mechanical sensor is used in an engine room while the electrical sensor is used in a passenger compartment.

The subsidiary shock sensor 90 is for preventing an operation error of the air bag system to improve reliability of the air bag system. The subsidiary shock sensor 90 is located in the different room different form the main shock sensor 80 if the main shock sensor 80 is of a mechanical type. Otherwise, the subsidiary shock sensor 90 is located in the same room together with the main shock sensor 80 if the main shock sensor 80 is of an electrical type. The main shock sensor 80 of a mechanical type may erroneously be given an impact due to a shock and turned on during examination of the engine room. Likewise, the main shock sensor 80 of an electrical type may also erroneously be turned on due to electromagnetic interference. In either case, the air bag system is inhibited from operation because the subsidiary shock sensor 90 is kept in an off state. In other words, the air bag system is started only when both the main shock sensor and the subsidiary shock sensor are put into an on state whether the main shock sensor is of a mechanical type or an electrical type.

The main shock sensor 80 can cope with various acceleration or impact modes and is turned on when a particular acceleration waveform is detected. For any acceleration mode, the subsidiary shock sensor 90 must be turned on during a shock detection interval of the main shock sensor 80. In this connection, the subsidiary shock sensor 90 must have sufficiently long shock detection interval. Thus, requirements for the subsidiary shock sensor 90 are (1) to be operable at a relatively low acceleration, (2) to have a sufficiently long shock detection interval (closure interval of the contact), (3) to have a simple structure, and (4) to have an excellent reliability.

Figure 9:
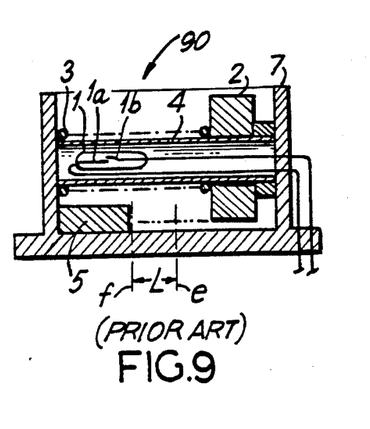
FIG. 9 is a vertical sectional view of another conventional shock sensor which serves as a subsidiary shock sensor in the conventional air bag system.

FIG. 9 shows a conventional subsidiary shock sensor 90 with a reed switch 1. The conventional subsidiary shock sensor satisfies the above-enumerated requirements to some extent.

Referring to FIG. 9, a structure and an operation of the conventional subsidiary shock sensor 90 will be described in detail. The subsidiary shock sensor 90 comprises a reed switch 1, a cylindrical member 4 containing the reed switch 1, a cylindrical magnet 2 which is loosely fitted to an outer surface of the cylindrical member 4 and which is responsive to an impact and moves to activate the reed switch 1, a coil spring 3 for urging the magnet 2 in an anti-impact direction, a housing 7 for fixedly supporting the cylindrical member 4. The coil spring 3 is fitted to the outer surface of the cylindrical member 4. A stopper 5 is formed forwardly in a travelling direction of the magnet 2 to define a range of the movement of the magnet 2. Thus, the subsidiary shock sensor 90 has a structure substantially similar to that of the shock sensor illustrated in FIG. 1.

Now, operation of the shock sensor will be described. In a normal state without any shock, magnetic tongues 1a and 1b forming a contact of the reed switch 1 in the cylindrical member 4 are opened as illustrated in the figure. The magnet 2 is maintained at a righthand position in the figure by an urging force of the coil spring 3. When the acceleration greater than a predetermined value is applied due to shock such as a collision, the magnet 2 is moved leftwardly in the figure against the urging force of the coil spring 3. When the magnet 2 approaches the reed switch 1, magnetic flux of the magnet 2 intersects the magnetic tongues 1a and 1b to magnetize the magnetic tongues 1a and 1b. As a result, the magnetic tongues 1a and 1b are closed.

In the shock sensor illustrated in FIG. 9, the magnet 2 moves in response to variation of the acceleration. When the magnet 2 reaches a position e, the reed switch 1 is closed. With the movement of the magnet 2, the angle between the magnetic flux and the magnetic tongue 1b is varied. When the magnet 2 reaches a position f, the magnetic flux and the magnetic tongue 1b become substantially parallel to each other. Accordingly, the reed switch 1 is opened. Thus, the contact is kept closed while the magnet 2 is present in an activating area L between the position c and the position f. In the shock sensor, it is possible to provide a long closure interval of the contact by increasing the time duration during which the magnet 2 is present in the activating area L.

In order to increase the closure interval by increasing the time duration during which the magnet 2 is present in the activating area L, the shock sensor illustrated in FIG. 9 requires selection of an appropriate spring constant of the coil spring 3 or increase of a frictional coefficient between the magnet 2 and the cylindrical member 4. However, with this structure, it is difficult to obtain a sufficient closure interval specifically adapted to each of the various collision modes.

Figure 10A:
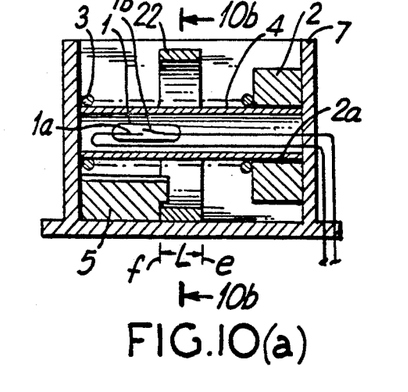
FIG. 10(a) is a vertical sectional vie of a shock sensor according to a fifth embodiment of this invention.
Figure 10B:
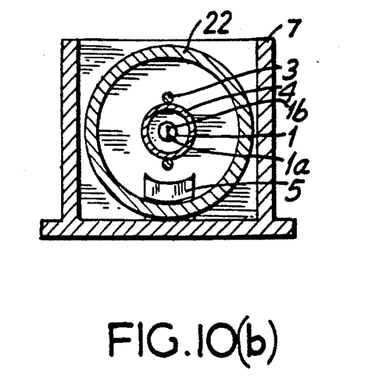
FIG. 10(b) is a sectional view taken along a line 10b—10b in FIG. 10(a)

Referring to FIGS. 10(a) and 10(b), a shock sensor according to a fifth embodiment of this invention will be described. In FIGS. 10(a) and 10(b), the similar parts are designated by like reference numerals as in FIG. 9. The shock sensor is substantially similar to that illustrated in FIG. 9 except that a ferromagnetic member 22 is arranged at a position in close proximity of the outer surface of the magnet 2 while the magnet 2 is present in the activating area.

The ferromagnetic member 22 comprises a cylindrical body exhibiting a strong magnetic property and is fixed to the housing 7. The ferromagnetic member 22 has an inner diameter slightly larger than an outer diameter of the magnet 2 so that the magnet 2 can be inserted into the ferromagnetic member 22. A location and a length of the ferromagnetic member or brake 22 are determined so that the ferromagnetic member 22 is within the activating area L. Repeatedly speaking, the contact of the reed switch 1 is closed when the magnet 2 is within the activating area L. The ferromagnetic member 22 will be referred to as a control arrangement.

Next, operation of the shock sensor including the ferromagnetic member 22 will be described. The reed switch 1 fixed in the cylindrical member 4 has the magnetic tongues 1a and 1b which form the contact in combination. In a normal state, the magnetic tongues 1a and 1b are opened as illustrated in the figure while the magnet 2 is maintained at a righthand position in the figure by the urging force of the coil spring 3. When the acceleration greater than a predetermined value is applied upon occurrence of a shock such as a collision, the magnet 2 moves leftwardly in the figure against the urging force of the coil spring 3. Since the ferromagnetic member 22 is located forwardly in a travelling direction of the magnet 2, the ferromagnetic member 22 is gradually magnetized by the magnet 2 with the movement of the magnet 2.

Figure 11A:
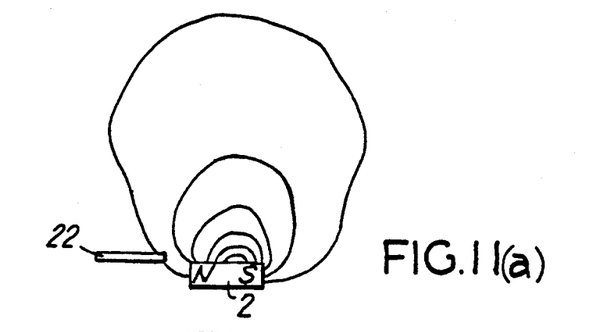
FIGS. 11(a)-11(c) are views for describing magnetization of a ferromagnetic material mounted in the shock sensor illustrated in FIG. 10 in a sequential fashion.
Figure 11B:
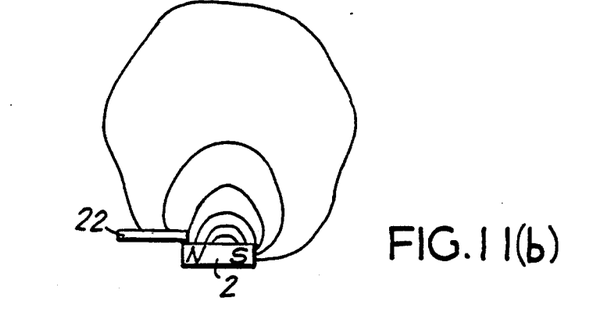
Figure 11C:
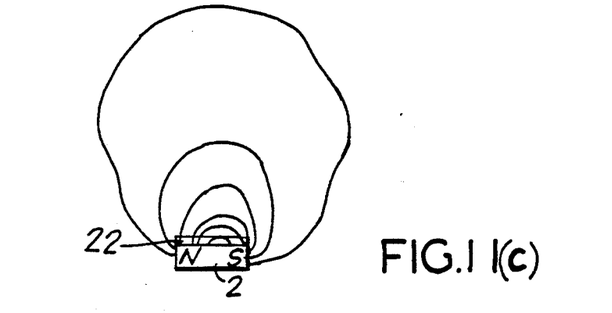

FIGS. 11(a) through (c) show magnetization of the ferromagnetic member 22 by the magnetic flux in a sequential fashion.

When the magnet 2 reaches the position e, the magnetic flux radiated from a center hole 2a of the magnet 2 acts on the magnetic tongues 1a and 1b forming the contact of the reed switch 1 to magnetize the magnetic tongues 1a and 1b. Thus, the reed switch 1 is closed. As illustrated in FIG. 11(a), the ferromagnetic member located forwardly of the magnet 2 is magnetized by the magnet 2. Subsequently, as shown in FIG. 11(b), the magnetized ferromagnetic member 22 approaches the outer surface of the magnet 2 and attracts the magnet 2. As shown in FIG. 11(c), when the magnet 2 is attracted by the magnetized ferromagnetic member 22 and enters into the activating area L (namely, enters into the magnetized ferromagnetic member 22), the magnetized ferromagnetic member 22 suppresses the movement of the magnet 2 to reduce the velocity of the magnet 2.

As a result, the magnet 2 is attracted by the ferromagnetic member 22 to be retained in the activating area L. Thus, a sufficient closure interval is obtained.

In this embodiment, the ferromagnetic member 22 has a cylindrical shape and approaches the magnet 2 at a radially outward position. Similar effect is obtained with the ferromagnetic member of other structure. Furthermore, similar effect is obtained with a sensor cover or a housing made of a ferromagnetic material and having a shielding function.

FIGS. 12 through 15 show other embodiments of this invention with different ferromagnetic members. In these figures, similar parts are designated by like reference numerals as the shock sensor illustrated in FIG. 9 and will not be described any longer.

Figure 12A:
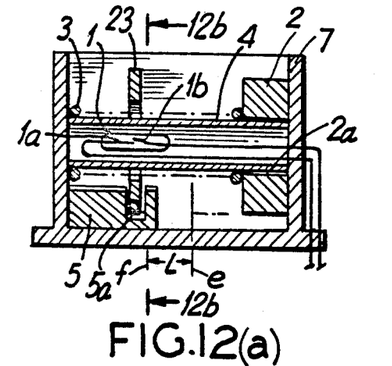
FIG. 12(a) is a vertical sectional view of a shock sensor according to a sixth embodiment of this invention.
Figure 12B:
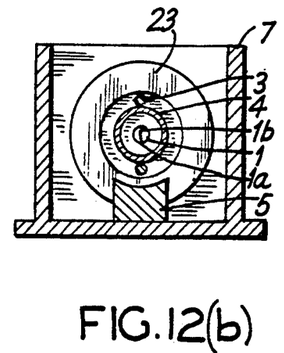
FIG. 12(b) is a sectional view taken along a line 12(b)—12(b) in FIG. 12(a)

FIG. 12(a) is a vertical sectional view of a shock sensor according to a sixth embodiment of this invention. FIG. 12(b) is a sectional view taken along a line 12(b)-12(b) in FIG. 12(a). A ferromagnetic member 23 comprises a perforated or annular disk locate din a groove 5a of the stopper 5 frontwardly of a thickness direction of the magnet 2. With this structure, the ferromagnetic member 23 is not brought into direct contact with the magnet 2 which moves in response to a shock such as a collision.

Figure 13A:
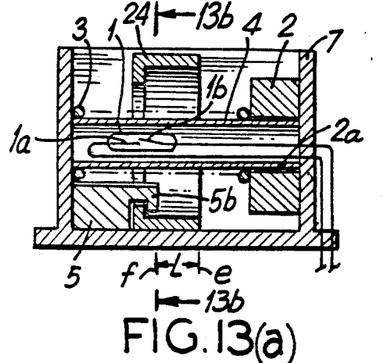
FIG. 13(a) is a vertical sectional view of a shock sensor according to a seventh embodiment of this invention.
Figure 13B:
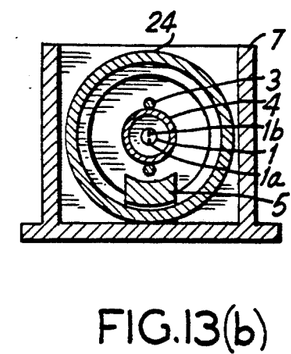
FIG. 13(b) is a sectional view taken along a line 13(b)—13(b) in FIG. 13(a)

FIG. 13(a) is a vertical sectional view of a shock sensor according to a seventh embodiment of this invention. FIG. 13(b) is a sectional view taken along a line 13(b)-13(b) in FIG. 13(a). A ferromagnetic member 24 comprises a perforated or annular shaped cup located at a position such that a top end 5b of the stopper 5 is inserted into the ferromagnetic member 24. With this structure, the ferromagnetic member 24 is not brought into direct contact with the magnet 2 which moves in response to a shock such as a collision but is approachable to the magnet 2 in the radially outward direction and in a thickness direction of the magnet 2.

Figure 14A:
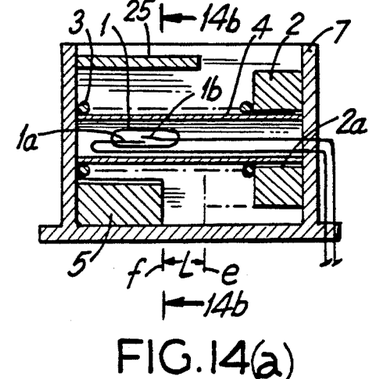
FIG. 14(a) is a vertical sectional view of a shock sensor according to an eighth embodiment of this invention.
Figure 14B:
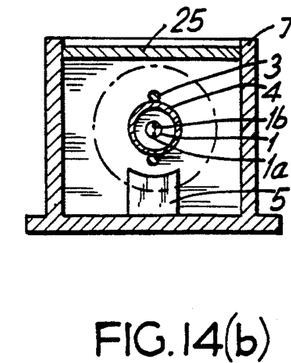
FIG. 14(b) is a sectional view taken along a line 14(b)—14(b) in FIG. 14(a)

FIG. 14(a) is a vertical sectional view of a shock sensor according to an eighth embodiment of this invention. FIG. 14(b) is a sectional view taken along a line 14(b)-14(b) in FIG. 14(a). A ferromagnetic member 25 comprises a flat plate attached to the end surface of the housing 7 and located forwardly above the magnet 2 which moves in response to a shock such as a collision. The ferromagnetic member 25 extends over a distance including the activating area L and is approachable to the magnet 2 in the radially outward direction.

Figure 15A:
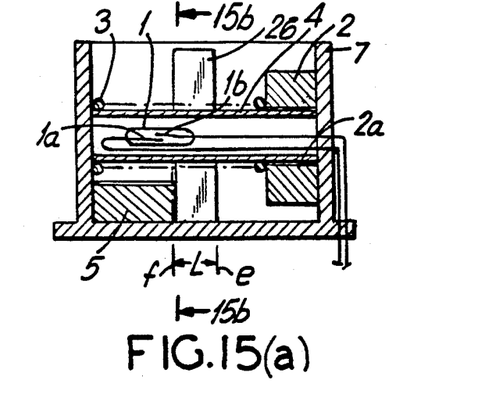
FIG. 15(a) is a vertical sectional view of a shock sensor according to a ninth embodiment of this invention.
Figure 15B:
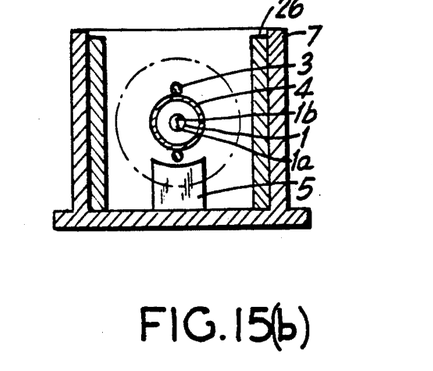
FIG. 15(b) is a sectional view taken along a line 15(b)—15(b) in FIG. 15(a)

FIG. 15(a) is a vertical sectional view of a shock sensor according to a ninth embodiment of this invention. FIG. 15(b) is a sectional view taken along a line 15(b)-15(b) in FIG. 15(a). A ferromagnetic member 26 comprises a pair of flat plates located on both side surfaces of the housing 7 within the activating area L. The ferromagnetic member 26 is approachable to the magnet 2 in the radially outward direction.

In every case, when the magnet 2 is attracted by the ferromagnetic members 23 through 26 and enters into the activating area L, the magnet 2 enters into or approaches to the magnetized ferromagnetic members 23 through 26. Thus, the movement of the magnet 2 is prevented by the magnetized ferromagnetic members 23 through 26 to reduce the velocity of the magnet 2. As a result, the magnet 2 is retained in the activating area L for a long time to thereby provide a sufficiently long closure interval.

Accordingly, the shock sensors according to the fifth through the ninth embodiments can cope with any acceleration mode. The shock sensors are particularly applicable to the subsidiary shock sensor which requires a long closure interval of the reed switch 1. If the structure describe din conjunction with any of the first through the third embodiments of this invention is incorporated into the shock sensor according to the fifth through the ninth embodiments described above, it is possible to further increase the closure interval of the reed switch 1. In addition, if the structure described in conjunction with the fourth embodiment of this invention is incorporated into the fifth through the ninth embodiments, the shock sensor can be reduce din size along the acceleration detecting direction Ad.

Figure 16:
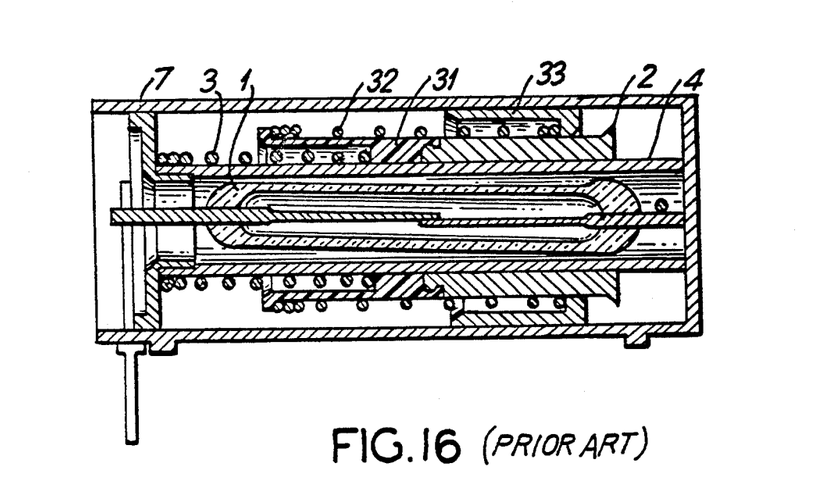
FIG. 16 is a vertical sectional view of another conventional shock sensor.

In order to provide a necessary closure interval, a conventional collision sensor illustrated in FIG. 16 has been proposed (Japanese Patent Prepublication No. 48169/1991) or U.S. Pat. No. 4,877,927 which issued on Oct. 31, 1989. The conventional shock sensor comprises a reed switch 1, a cylindrical member 4 for containing the reed switch 1, a cylindrical magnet 2 which is loosely fitted to the outer surface of the cylindrical member 4 and which is for activating the reed switch 1, a first coil spring 3 for urging the magnet 2 in an anti-impact direction, a carriage 31 which is for holding the magnet 2 on the outer surface of the cylindrical member 4 and which is slidable between both ends of the cylindrical member 4, a nonmagnetic block 33 which is loosely fitted to the outer surface of the carriage 31 of synthetic resin and which moves in response to an impact, a second coil spring 32 for urging the nonmagnetic block 33 in the anti-impact direction, and a housing 7 for fixing the cylindrical member 4.

Next, operation of the shock sensor will be described. On occurrence of a shock such as a collision, the magnet 2 is subjected to acceleration or impact due to the collision and moves leftwardly of the figure against the urging force of the first coil spring 3. When the magnet 2 reaches the activating position, the carriage 31 attempts to move in the anti-impact direction because the carriage 1 is brought into contact with the end surface of the housing 7. However, the nonmagnetic block 33 moves leftwardly of the figure to one end of the carriage 31 against the urging force of the second coil spring 32. An inertial force of the nonmagnetic block 33 is transmitted to the one end of the carriage 31. Accordingly, the carriage 31 and the magnet 2 are maintained in the activating area throughout a whole period during which the nonmagnetic block 33 moves.

However, in the shock sensor illustrated in FIG. 16, the inertial force of the nonmagnetic block 33 for maintaining the magnet 2 in the activating area is dependent upon variation of the acceleration or impact due to the collision. Accordingly, it is difficult to obtain a sufficiently long closure interval specifically adapted to each of the various acceleration modes, for example, a head-on collision and an oblique collision. Since the nonmagnetic block 33 is mounted on the carriage 31, the movement of the nonmagnetic block 33 is completely dependent upon the movement of the carriage 31. Sometimes the inertial force of the nonmagnetic block 33 may not be fully utilized due to the movement of the carriage 31.

Figure 17:
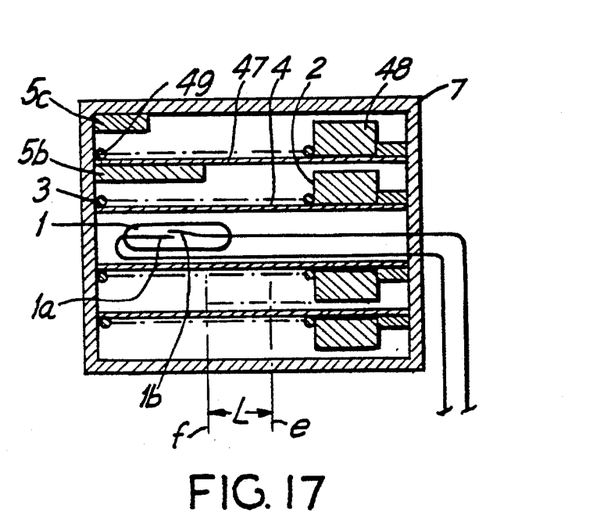
FIG. 17 is a vertical sectional view of a shock sensor according to a tenth embodiment of this invention.

Referring to FIG. 17, a shock sensor according to a tenth embodiment of this invention will be described. The shock sensor is similar to the shock sensor illustrated in FIG. 9 except that two coil springs individually urge two magnets in the anti-impact direction t activate the reed switch.

The shock sensor comprises a reed switch 1, a first cylindrical member 4 containing the reed switch 1, a first magnet 2 which is loosely fitted to the outer surface of the first cylindrical member 4 and which moves in response to an impact due to collision t activate the reed switch 1, a first coil spring 3 for urging the first magnet 2 in the anti-impact direction, and a stopper 5b formed in a travelling direction of the first magnet 2 to restrict a range of the movement of the first magnet 2. The shock sensor further comprises a second cylindrical member 47 for receiving the first cylindrical member 4, a second magnet 48 which is loosely fitted to the outer surface of the second cylindrical member 47 and which moves in response to an impact due to collision to activate the reed switch 1, a second coil spring 49 for urging the second magnet 48 in the anti-impact direction, a stopper 5c formed in a travelling direction of the second magnet 48 to restrict a range of the movement of the second magnet 4, and a housing 7 for fixing the first and the second cylindrical members 4 and 47. The coil springs 3 and 49 are fitted to the outer surfaces of the first and the second cylindrical members 4 and 47, respectively.

A velocity difference is created between the first magnet 2 and the second magnet 48 so that the first magnet moves faster than the second magnet 48. To provide the velocity difference, first and second spring constants k1 and k2 of the first and the second coil springs 3 and 49 and first and second masses m1 and m2 of the first and the second magnets 2 and 48 are selected so that $k1 < k2$ and $m1 \geq m2$. Although magnetic forces of the magnets 2 and 48 are adjusted so that the magnets 2 and 48 are retained in the activating area for a long time, orientation of magnetic poles is not restricted.

Next, operation of the shock sensor of this structure will be described with reference to FIGS. 18(a) through 18(d). FIGS. 18(a) through 18(d) show the operation of the shock sensor in a sequential fashion. Herein, the magnets 2 and 48 are arranged so that magnetic poles of the magnets 2 and 48 are oriented in different directions.

Figure 18A:
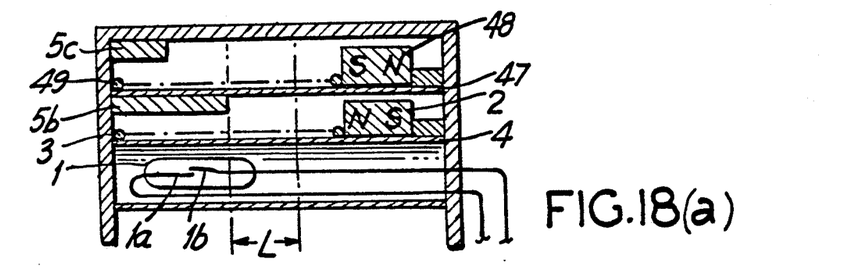
FIGS. 18(a) through 18(d) are views for describing an operation of the shock sensor illustrated in FIG. 17 in a sequential fashion.

In a normal state without any shock, the magnetic tongues 1a and 1b forming the contact of the reed switch 1 in the first cylindrical member 4 are opened as shown in FIG. 18(a). The first and the second magnets 2 and 48 are held at the righthand positions in the figure by urging forces of the first and the second coil springs 3 and 49, respectively.

Figure 18B:
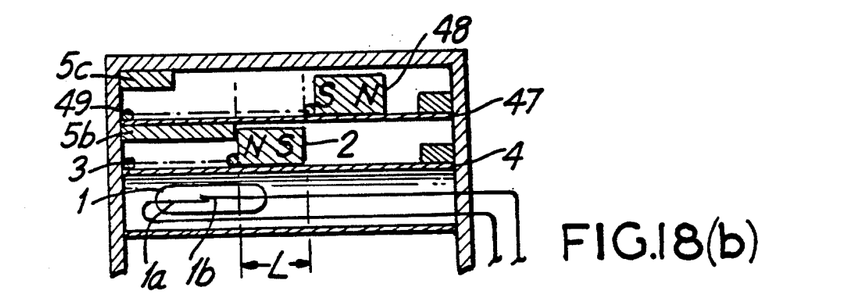

Upon occurrence of a shock such as a collision, the magnets 2 and 48 are responsive to the acceleration or impact due to the collision and move leftwardly of the figure against the urging forces of the first and the second coil springs 3 and 49, respectively. As described above, the first and the second spring constants k1 and k2 of the first and the second coil springs 3 and 49 and the first and the second masses m1 and m2 of the first and the second magnets 2 and 48 are selected so that $k1 < k2$ and $m1 \geq m2$. Accordingly, the first magnet 2 moves faster than the second magnet 48. As shown in FIG. 18(b), the first magnet 2 first enters into the activating area L to close the contact of the reed switch 1.

Subsequently, the second magnet 48 attempts to enter into the activating area L. If the first and second magnets 2 and 48 are arranged so that the magnetic poles of the first and the second magnets 2 and 48 are oriented in different directions, the first and the second magnets 2 and 48 repel each other because the same magnetic poles closely approach as shown in FIG. 18(b). Thus, the second magnet 48 enters into the activating area L at a reduced velocity. If the magnets 2 and 48 are arranged so that the magnetic poles of the first and the second magnets 2 and 48 are oriented in the same direction, the first magnet 2 is attracted by the second magnet 48. This results in reduction of a velocity along a direction away from the activating area L.

Figure 18C:
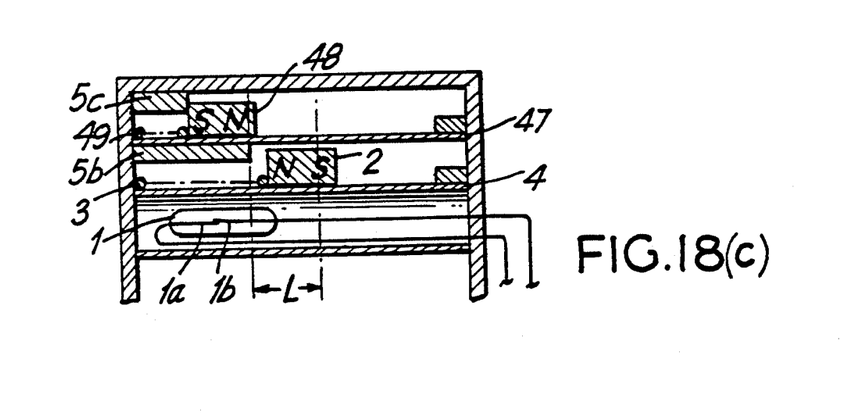

When the magnets 2 and 48 further move on, the second magnet 48 is brought into contact with the stopper 5c formed at one end of the second cylindrical member 47 as shown in FIG. 18(c). Then, the second magnet 48 is ready to move in the anti-impact direction. The first magnet 2 is moved in the direction away from the activating area L. If the first and the second magnets 2 and 48 are arranged so that the magnetic poles of the first and the second magnets 2 and 48 are oriented in different directions as illustrated in the figure, the first magnet 2 is subjected to repulsive force away from the activating area L while the contact of the reed switch 1 is kept closed by the magnetic field of the second magnet 48. If the first and the second magnets 2 and 48 are arranged so that the magnetic poles of the first and the second magnets 2 and 48 are oriented in the same direction, the first magnet 2 is attracted by the second magnet 48 to reduce a velocity in the direction away from the activating area L. In this while, the first magnet 2 is present in the activating area L so that the contact of the reed switch 1 is kept closed.

Figure 18D:
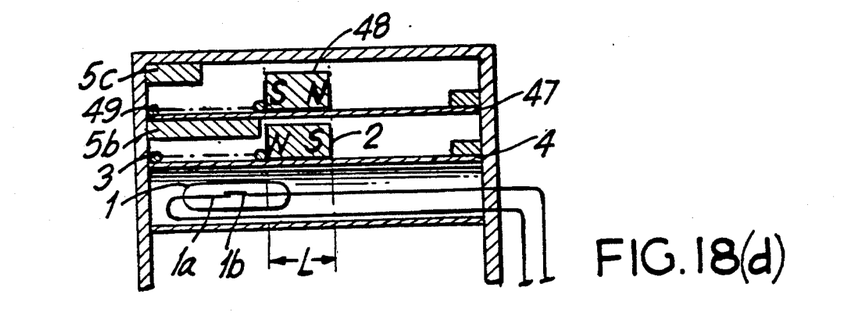

When the first and the second magnets 2 and 48 still further move, the first and the second magnets 2 and 48 overlap each other as shown in FIG. 18(d). When the first and the second magnets 2 and 48 are arranged so that the magnetic poles are oriented in different directions as illustrated in the figure, the magnets 2 and 48 are rendered integral by an attractive force because the different magnetic poles face each other. In this event, the moving velocity is further reduced because a total mass (m1+m2) of the first and the second masses m1 and m2 of the first and the second magnets 2 and 48 is integrally moved. If the magnets 2 and 48 are arranged so that the magnetic poles are oriented in the same direction, the first and the second magnets 2 and 48 are at first attractive and become repulsive with the progress of overlapping. Accordingly, the moving velocities of the first and the second magnets 2 and 48 are further reduced. In this while, since the first and the second magnets 2 and 48 are present in the activating area L, the contact of the reed switch 1 is kept closed.

Thus, in the shock sensor according to this embodiment, the first magnet 2 is retained in the activating area for a long time upon occurrence of a shock such as a collision. Accordingly, a long closure interval is obtained.

In the tenth embodiment, the first and the second spring constants k1 and k2 of the first and the second coil springs 3 and 49 and the first and the second masses m1 and m2 of the first and the second magnets 2 and 48 are selected so that $k1 < k2$ and $m1 \geq m2$ in order to move the first magnet 2 faster than the second magnet 48. However, similar effect is obtained when the second magnet 48 moves faster than the first magnet 2. In this event, the first and the second spring constants k1 and k2 of the first and the second coil springs 3 and 49 and the first and the second masses m1 and m2 of the first and the second magnets 2 and 48 are selected so that $k1 > k2$ and $m1 \leq m2$. In the tenth embodiment, a magnetic block may be used instead of the second magnet 48. In this case, it is necessary to adjust the first and the second spring constants k1 and k2 of the first and the second coil springs 3 and 49, the first mass m1 and the magnetic force of the first magnet 2, and the displacement of the first magnet 2 so that the magnetic block is present within a range magnetizable by the magnetic force of the first magnet 2.

At any rate, the shock sensor according to this embodiment can cope with various acceleration modes by adjusting a closure interval. Accordingly, the shock sensor is particularly applicable to the subsidiary shock sensor which requires a sufficiently long closure interval of the reed switch. If the structure described in conjunction with any of the first through the third embodiments of this invention is incorporated into the shock sensor according to the tenth embodiment described above, it is possible t further increase the closure interval of the reed switch 1. In addition, if the structure described in conjunction with the fourth embodiment of this invention is incorporated into the tenth embodiment, the shock sensor can be reduced in size along the acceleration detecting direction Ad.

What is claimed is:

1. A shock sensor comprising a hollow cylindrical member containing a reed switch disposed within an activation area thereof, a cylindrical magnet surrounding and loosely fitted externally to said hollow cylindrical member and adapted to be movable along its outer peripheral surface during an applied shock, an elastically yieldable member cooperatively associated with said magnet and for urging said magnet to a stationary position located at one end of said hollow cylindrical member towards an anti-impact direction, stopper means located at an opposite end of said hollow cylindrical member forward of said activation area for restricting the movement of said magnet during said applied shock, said stopper means providing a stop position for said magnet, and a housing containing said hollow cylindrical member, said magnet, said elastically yieldable member, and said stopper means, wherein:

a gap is provided between an outer peripheral surface of said magnet and in inner peripheral surface of said housing, said gap in said activation area between said stationary position and said stop position being narrower than an annular gap in a remaining area, and wherein said reed switch is caused to be closed by a magnetic force applied by said magnet when said magnet is caused to move into said activation area towards said stop means.

2. A shock sensor as claimed in claim 1, further comprising an air passage formed in a wall of said housing along a travelling direction of said magnet, said air passage being adapted for circulating air through a passage of said magnet from said one end of said shock sensor to its opposite end.

3. A shock sensor comprising a hollow cylindrical member containing a reed switch disposed within an activation area thereof, a shaft disposed perpendicular to a longitudinal direction of said hollow cylindrical member, a cylindrical magnet surrounding and loosely fitted externally to said shaft and adapted to be movable along its outer peripheral surface during an applied shock, an elastically yieldable member for urging said magnet to a stationary position of said magnet located at one end of said shaft towards an anti-impact direction, stopper means located at an opposite end of said shaft for restricting the movement of said magnet, said stopper means providing a stop position of said magnet when said magnet is caused to move by an applied shock, a housing containing said hollow cylindrical member said shaft, said magnet, said elastically yieldable member and said stopper means, and a magnetic member disposed forward of said magnet with respect to its traveling direction and having a magnetic outer peripheral surface disposed towards said reed switch.

4. A shock sensor comprising a hollow cylindrical member containing a reed switch disposed in an activation area, a cylindrical magnet surrounding and loosely fitted externally to said hollow cylindrical member and adapted to be movable along an outer peripheral surface of said hollow cylindrical member, an elastically yieldable member for urging said magnet to a stationary position of said magnet located at one end of said hollow cylindrical member towards an anti-impact direction, stopper means located at an opposite end of said hollow cylindrical member for restricting the movement of said magnet and to define a stop position for said magnet, and a housing containing said hollow cylindrical member, said magnet, said elastically yieldable member, and said stopper means, said shock sensor further comprising a ferromagnetic member located in close proximity to an outer periphery of said magnet when said magnet is in cooperative relationship in said activation area in which said reed switch is caused to close by a magnetic force applied by said magnet.

5. A shock sensor comprising a first hollow cylindrical member containing a reed switch disposed within an activation area, a first cylindrical magnet surrounding and loosely fitted externally to said first hollow cylindrical member and adapted to be movable along an outer peripheral surface of said first hollow cylindrical member a first elastically yieldable member for urging said first magnet to a stationary position located at one end of said first hollow cylindrical member towards an anti-impact direction, first stopper means located at the opposite end of said first hollow cylindrical member for restricting the movement of said first magnet and to define a stop position for said first magnet when subjected to shock, and a second hollow cylindrical member concentrically surrounding said first hollow cylindrical member and containing said first hollow cylindrical member, said first magnet, said first elastically yieldable member, said first stopper means, and said concentric surrounding second cylinder having a second cylindrical magnet surrounding and loosely fitted externally to said second hollow cylindrical member and adapted to be movable along an outer peripheral surface of said second hollow cylindrical member, a second elastically yieldable member for urging said second magnet to a stationary position located at one end of said second hollow cylindrical member towards an anti-impact direction, a second stopper means located at the opposite end of said second hollow cylindrical member for restricting the movement of said second magnet and to define a stop position of said magnet when subject to shock, and a housing containing said second hollow cylindrical member, said second magnet, said second elastically yieldable member, and said second stopper means, wherein: said first magnet and said first elastically yieldable member being responsive to an applied shock and caused to move at a first moving velocity while said second magnet and said second elastically yieldable member area are caused to be responsive to said applied shock and moved at a second moving velocity different from said first moving velocity.

6. A shock sensor as claimed in claim 5, wherein a first elastic constant k1 of said first elastically yieldable member is less than a second elastic constant k2 of said second elastically yieldable member when mass m1 of said first magnet is not less than a mass m2 of said second magnet.

7. A shock sensor as claimed in claim 5, wherein a first elastic constant k1 of said first elastically yieldable member is greater than a second elastic constant k2 of said second elastically yieldable member when mass m1 of said first magnet is not greater than a mass m2 of said second magnet.

* * * * *